United States Patent [19]

Meitner

[11] Patent Number: 4,493,868
[45] Date of Patent: Jan. 15, 1985

[54] HIGH BULK BONDING PATTERN AND METHOD

[75] Inventor: Gary H. Meitner, Winneconne, Wis.

[73] Assignee: Kimberly-Clark Corporation, Neenah, Wis.

[21] Appl. No.: 458,502

[22] Filed: Jan. 17, 1983

Related U.S. Application Data

[63] Continuation-in-part of Ser. No. 330,288, Dec. 14, 1982, abandoned.

[51] Int. Cl.³ .............................................. B32B 5/14
[52] U.S. Cl. .................................. 428/171; 156/220; 156/290; 428/156; 428/170; 428/195; 428/288; 428/296; 428/903
[58] Field of Search ............... 428/156, 170, 171, 195, 428/288, 296, 903; 156/290, 220

[56] References Cited

U.S. PATENT DOCUMENTS

| | | | |
|---|---|---|---|
| 3,016,599 | 1/1962 | Perry | 428/903 |
| 3,542,634 | 11/1970 | Such et al. | 428/135 |
| 4,078,124 | 3/1978 | Prentice | 428/296 |
| 4,100,319 | 7/1978 | Schwartz | 428/195 |
| 4,170,680 | 10/1979 | Cumbers | 428/195 |
| 4,315,965 | 2/1982 | Mason et al. | 428/296 |
| 4,333,979 | 6/1982 | Sciaraffa et al. | 428/296 |

Primary Examiner—James J. Bell
Attorney, Agent, or Firm—William D. Herrick; R. Jonathan Peters; Howard Olevsky

[57] ABSTRACT

Production of high bulk nonwoven materials particularly useful as wipers and the like having a varying pattern of bonds and cloth-like feel. In one embodiment the method includes opposed, varying, high density bonding patterns on opposite sides of the materials formed by contact with surfaces having varyingly shaped or sided lands and grooves. Where both surfaces are contacted by such lands and grooves, increased spacing in the unbonded areas permits high loft, essentially unbonded fiber portions between the bond points. Construction of the individual land areas is preferable with tapered sides with vertical so as to permit engraving and high bond density and pattern depth while reducing wear. Resulting products have unique softness and absorbency characteristics for improved wipers because of the bond constructions. In addition, a wide variety of attractive patterns may be obtained. Preferred thermoplastic materials include spunbonded or meltdown polypropylene alone or in combination with wood cellulose and/or staple textile fibers.

23 Claims, 17 Drawing Figures

HIGH BULK BONDING PATTERN AND METHOD

CROSS-REFERENCE TO RELATED APPLICATION

This application is a continuation-in-part of copending application Ser. No. 330,288, filed Dec. 14, 1982, now abandoned.

BACKGROUND OF THE INVENTION

1. Field of the Invention

The present invention relates to the field of manufacture of nonwoven materials and resulting products. Because of the economy of manufacture and the wide variety of constructions and compositions, the growth of nonwovens as base materials has been quite rapid. Such materials may be produced at high speeds utilizing synthetic thermoplastic fibers with or without additional components or treatments depending upon the desired end use. In heavy basis weights where softness is not as critical such materials have found a wide range of applications from roadbed construction to home furnishings. In lighter basis weights, nonwovens have been particularly useful in the manufacture of disposable sanitary and infant care products as liners and absorbent materials. One use for which nonwovens in the middle basis weight range have found wide acceptance is for wiper products in the disposable and limited use areas. A selection is available of wiper materials that are particularly effective for clean wiping and absorbing both oily and aqueous liquids.

In most cases, however, the manufacture of nonwovens has involved a compromise between the economies of high speed manufacture and synthetic thermoplastics and the desirable soft, flexible tactile properties of conventional textiles. In some cases, it has also been necessary to sacrifice strength and other physical properties. As improvements to nonwoven manufacture are developed, the gap between these properties of conventional textile materials has narrowed. The present invention is directed to further improvements in nonwovens and their manufacture that achieve to a high degree bulk and other desirable textile-like properties while retaining the benefits of nonwovens. In particular, the present invention relates to the bonding of nonwoven materials and resulting products that achieve these and other desired results.

2. Description of the Prior Art

Much attention has been given the bonding of nonwoven fabrics. In general, bonding may be achieved by a variety of means. For example, such webs may be bonded autogenously by contacting the filaments or fibers in a tacky state. Alternatively, treatment with tackifying agents such as solvents or adhesives may be used. In many cases it is desirable to bond only within a patterned area to achieve a more flexible, fabric-like feel. Such pattern bonding may be obtained, for example, by patterned adhesive application or the application of heat and/or pressure in patterned areas. Representative of the latter type of bonding is U.S. Pat. No. 4,170,680 to Cumbers issued Oct. 9, 1979. This patent achieves a pattern of irregular bonds of continuous lands on one side and isolated projections on the other. A similar description is found in U.S. Pat. No. 4,005,169 to Cumbers dated Jan. 25, 1977. An earlier disclosure in U.S. Pat. No. 3,507,943 to Such, et al. dated Apr. 21, 1970 relates to a regular bond pattern obtained by opposing patterned rolls which contact at uniformly spaced apart areas. U.S. Pat. No. 3,636,147 to Rowland issued Jan. 18, 1972 relates to a process of bonding nonwovens in a pattern wherein the speed of one of the bonding rolls is varied to produce aesthetic visual bond appearances. U.S. Pat. No. 4,211,743 to Nauta, et al. dated Jul. 8, 1980 relates to opposing embossing patterns wherein one pattern is much finer than the other and resilient embossing surfaces are used for improving full contact with the bond pattern.

While these disclosures evidence progress to a more textile-like nonwoven material, results have not been completely satisfactory. Additional improvements in softness and in the ability to use shorter fibers while retaining bulk and strength are desired. In addition, further improvements in the properties of nonwovens for selected applications such as wipers are desired.

SUMMARY

The present invention achieves to a high degree these additional improvements through a process including a bonding step accomplished with patterns of lands and grooves contacting web surfaces. In accordance with the invention, each pattern is variable and preferably results in a generally high bond density and an overall bond pattern of varying bond sizes and densities. In one embodiment the opposing web surfaces each contact lands and grooves in heat and pressure or ultrasonic bonding applications, and spacing between the bond areas permits essentially unbonded and bulky fibers outside the areas of the bond to overlap. Similar results are obtained in alternative embodiments where both patterns contact the same web surface. In all cases, the result is an aesthetically pleasing appearance with physical properties and characteristics approaching those characteristics of textile materials.

Preferred web compositions include synthetic thermoplastic materials, such as polyolefins, polyesters, polyamides and copolymers of any of these, with or without additional components such as cellulose wood fiber or staple textile fibers including polyester, cotton, rayon, nylon, and the like. Bonding is achieved at temperatures and pressures sufficient to permit flow and bonding to occur to the extent desired for strength and other physical properties. A particular advantage is that bonding rolls may be run randomly avoiding the need for registration and repositioning after opening. Since the bond patterns on the individual rolls interact to produce the resulting overall bond constructions, a wide variety of bond patterns may be obtained. By selecting irregular lands and grooves for each pattern, a desirable, essentially nonrepeating, random overall pattern is obtained. Alternatively, regular patterns may be used if applied to the material in varying orientations or if pattern dimensions are varied. Preferably these lands and grooves each comprise line patterns, some of which are continuous. The resulting products find particular application in disposable and limited use products such as wipers and disposable diapers and sanitary appliances but may also be used in more durable applications such as recreational fabrics.

DESCRIPTION OF THE PREFERRED EMBODIMENTS

Figure 1:
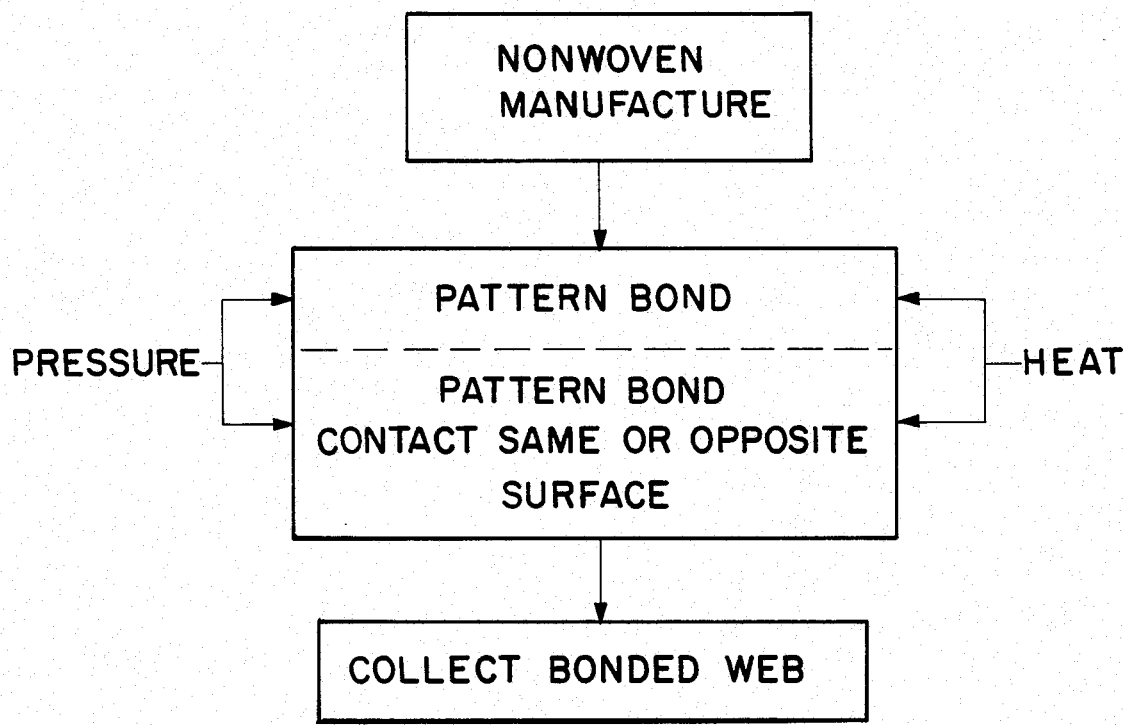
FIG. 1 is a flow chart illustrating the process of the present invention generally.

While the invention will be described in connection with preferred embodiments, it will be understood that it is not intended to limit the invention to those embodiments. On the contrary, it is intended to cover all alternatives, modifications, and equivalents as may be included within the spirit and scope of the invention as defined by the appended claims.

Certain tests have been employed in demonstrating the results obtained in accordance with the method and resulting products of the present invention. These tests are described as follows:

TRAPEZOIDAL TEAR

This test was carried out using an Instron tester essentially in accordance with ASTM D-1117, Section 14, Part 32. Specimens were cut 3 inches by approximately 6 inches and marked with an isosceles trapezoid template having a height of 3 inches and bases of 4 inches and 1 inch. A preliminary cut of about 15 mm was made perpendicular to and centered in the 1 inch base. The crosshead and chart speed was 12 inches per minute and the distance between the jaws was 1 inch. The grip size was 1½ inches by 3 inches. The load range of the Instron was selected such that the break occurred between 10 and 90% of full scale load. The specimen was placed in the machine clamping along the nonparallel sides to the trapezoid with the cut half way between the clamps. Holding the short edge taut, the edge was allowed to lie in folds. For each test the maximum and minimum tearing loads were noted and the average reported as the tearing load for the specimens.

BULK

This test was carried out with an Ames No. 16 Dial Comparitor with a Model 3222 long dial indicator from B.C. Ames Company, Watham, MA. A rectangular (1¾ inches by 5 inches) Lucite block ½ inch thick was used having one end of a Boston gear JS50-1 universal joint glued to it at the center of the 1¾ inches by 5 inches rectangle and the other end drilled out to fit on the spindle rod of the dial indicator. The combined weight of the spindle rod universal joint and block was adjusted to give a total dead weight of 183 grams. The samples were carefully placed on the bulk tester and the platen gently lowered on a uniform area and the reading taken after 3 seconds.

GRAB TENSILE

This test was carried out essentially in accordance with ASTM D-1117. An Instron tester was used with jaws having one face of each clamp 1 inch by 1 inch and the face of the other jaw of each clamp 1 inch by 2 inches or larger with the longer dimension perpendicular to the direction of load. The samples were cut to 4 inches by 6 inches and conditioned for at least one hour at 50% relative humidity and 73° F. The Instron was set up at a crosshead and chart speed of 12 inches per minute and a gauge length (distance between jaws), of 3 inches. The specimen was placed symmetrically in the clamps with the longer dimension parallel to the load application and the crosshead energized. The chart was read at the peak of the curve to determine tensile strength and the energy determined in accordance with the standard procedure. Percent stretch was determined as the distance from start to breaking point divided by the gauge length times 100.

HANDLOMETER

This test was carried out with a Handlometer from Point Albert Instrument Company, Philadelphia, PA. The test samples were 4 inches by 4 inches and conditioned at 50% relative humidity and 73° F. Using a 10 mm slot with flat plates the slot opening was aligned so that the blade bisected the slot in the center. All samples were placed on the platform aligned and centered with reference to both the slot and the blade. The 4 inch specimen was placed on the platform so that the direction to be tested was perpendicular to the slot. If the force exceeded the scale, the sample was reduced in width and the reading normalized to 4 inches. The specimens were aligned in both directions and the test was run in accordance with the instrument directions and results recorded in grams of force per 4 inches of width of specimen under the blade.

While the present invention will be described primarily in connection with nonwoven webs formed from synthetic thermoplastic polymers, it will be understood that any materials capable of bonding and deforming under conditions of heat and pressure may be used in connection with the present invention. Thus, for example, webs of materials not usually considered thermoplastic such as glass fibers, may be employed. In addition, the invention may be used in connection with bonding of laminates of such web materials described herein with films or other thermoplastic webs. Specific thermoplastic materials preferred for use in connection with the subject invention include those capable of bonding under temperature conditions in the range of from about 150° F. to 360° F. and pressures of about 200 to 500 lbs/lineal inch for 7 inch diameter rolls. These include, by way of example, polymers and copolymers of polyolefins such as polypropylene and polyethylene, polyesters, and polyamides such as nylon. For certain applications it will be desirable to incorporate into the web material other ingredients such as cellulose wood fibers, staple length textile fibers, fillers, and the like. For production of such materials, reference may be had to U.S. Pat. No. 4,100,324 to Anderson, et al. issued Jul. 11, 1978, the disclosure which is incorporated herein by reference. Depending upon the synthetic thermoplastic material used and the bonding conditions, up to about 75%, and preferably up to 60% by weight of such additional ingredients may be utilized. Advantageously, waste fibers may be incorporated up to about 75%, preferably up to about 60% by weight. For example, waste staple polyester fibers enhance bulk and thickness of the resulting product.

In selecting the relative patterns of lands and grooves to be applied to opposing surfaces of the nonwoven material, consideration of certain parameters is essential. The patterns must each be variable in direction, size or configuration in order to achieve the desired high loft and end result bond pattern. Further, it is preferred that at least some of the lands be essentially continuous lines and that the direction of the majority of lands of one pattern be generally at an angle producing predominantly substantially parallelogram-shaped bonds with a ratio of diagonals of less than 10 to 1, most preferably less than 6 to 1. When using line patterns, they preferably overlap to produce a pattern of generally parallelogram shaped bonds which may vary in size and orientation. Particularly when short fibers such as cellulose wood pulp are included, it is essential that the overall resulting bond pattern have an average density of at least 40 and preferably a higher average of at least about 90 bonds per square inch. Further, to retain the flexible, fabric-like characteristics, the total percent bond area should not be greater than 40% on the average, and preferably less than 30%. Within these parameters, a wide variety of aesthetically pleasing and effective bond patterns may be obtained.

In general, bonding in accord with the invention can be carried out in three ways. First is, using two bond patterns, each consisting of substantially parallel lines, some of which are continuous, and the separate patterns crossing at about 90°. Second is, a combination of non-parallel line patterns which cross at varying angles but result in parallelogram-shaped bond areas, a majority of which have a diagonal ratio no greater than 10:1, preferably no greater than 6:1. Third is, combination of open patterns of varying size or configuration producing depth and high density with reduced pins per roll and double bonding steps. To achieve the high bulk results essential to the present invention, it is necessary that the sum of the heights of the engraving for both patterns of lands and grooves be at least about 0.025 inch for materials having a basis weight in the range of from about 2.0 oz/yd$^2$ to 6.0 oz/yd$^2$. It will be recognized that this dimension will vary with different basis weight materials. While it is contemplated that the engraving height of each pattern will be about equal in most cases, the height may be greater for one pattern than the other to achieve desired opposing surface characteristics.

The particular configuration of the lands and grooves for each of the patterns is not critical and may be varied within wide ranges. However, it is preferred that line patterns be used because they can be constructed so as to have increased wear area for greater life. As described above, the lines of one pattern will preferably be at an angle with respect to that of the other pattern selected to minimize gross overlapping and individual bond areas. In one preferred embodiment, each of the patterns will have lines of irregular length with some lines being essentially continuous. It will be recognized that similar considerations will apply to patterned anvils of sonic bonding devices.

EXAMPLES

The invention will now be described in connection with examples demonstrating preferred embodiments.

EXAMPLE 1

A nonwoven material was formed essentially in accordance with U.S. Pat. No. 4,100,324 to Anderson, et al., the disclosure of which is incorporated herein by reference. In essence, a web of about 73 grams per square meter was formed by meltblowing polypropylene and adding thereto 40% by weight of wood pulp fibers. Two layers of this web were bonded to opposing sides of a spunbonded polypropylene web as described in U.S. Pat. No. 4,041,203 to Brock and Meitner issued Aug. 9, 1977. The spunbonded web had a basis weight of about 14 g/m$^2$. The composite was bonded by passing through a nip having a pattern as illustrated in U.S. Pat. No. Des. 239,566 having a pin density of 153 pins-/in.$^2$ and bonded area of 19.2%. The pins had a depth on the roll of 0.030 inch.

EXAMPLE 2

Figure 5:
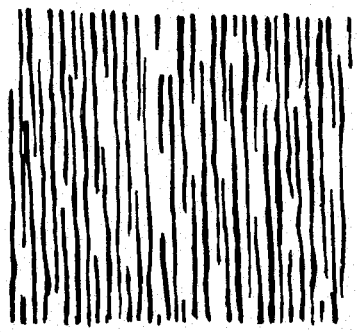
FIG. 5 illustrates a bond pattern for contact with one surface of the nonwoven material.
Figure 6:
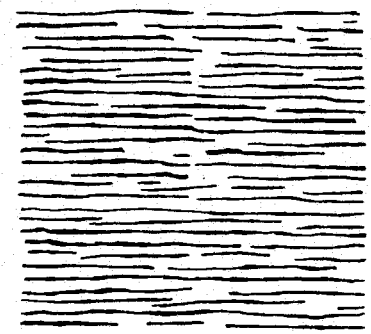
FIG. 6 illustrates a bond pattern for contact with the opposing web surface to that contacted with pattern of FIG. 5.
Figure 7:
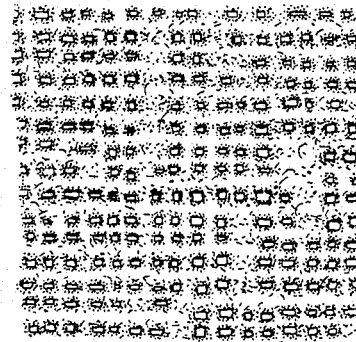
FIG. 7 illustrates the resulting bonded web material from the use of the line patterns of FIGS. 5 and 6.
Figure 8:
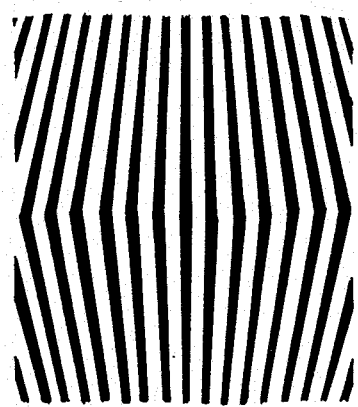
FIGS. 8 through 10 illustrate a second alternative bond arrangement using a line pattern in the manner of FIGS. 5 through 7.
Figure 9:
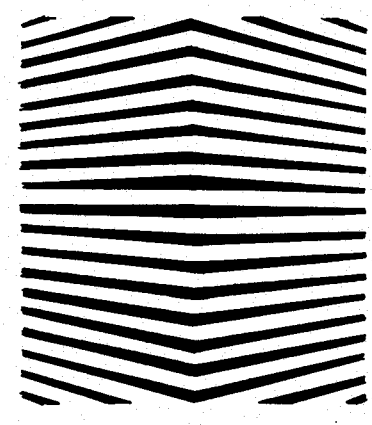
Figure 10:
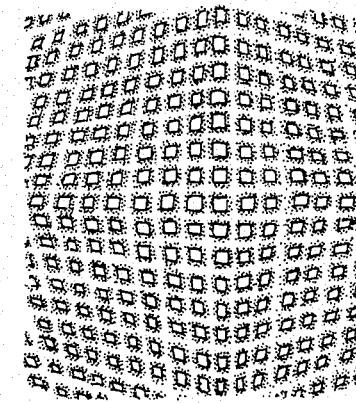

The material of Example 1 was bonded in accordance with the invention and, particularly FIGS. 5 through 7, wherein the opposing engravings were of equal depth of 0.031 in. for a total of 0.062 in. and the patterns were applied at about 90°. The lines were spaced at 12.6 lines/inch in the machine direction and 11.6 lines/inch in the cross direction with an average pattern density of about 146 pins/in.$^2$.

EXAMPLE 3

Example 1 was repeated except that 50% of ⅜" long staple fibers were added in place of the cellulose fibers.

EXAMLE 4

Example 2 was repeated using the material of Example 3.

EXAMPLE 5

Example 3 was repeated except that a web having a basis weight of 120 grams per square meter was produced.

EXAMPLE 6

Example 4 was repeated using the 120 gsm material of Example 5.

The following Table provides results of tests conducted on the materials of Examples 1 through 6. As shown, improved bulk was consistently obtained using the bonding procedure of the present invention. Other properties are only slightly adversely affected, if at all. Also, it will be apparent that the embodiment bonding opposed sides significantly improves bulk. For example, comparing the bulk of Examples 1 and 2, 3 and 4, and 5 and 6 demonstrates increased bulk ranging from 11 to about 14%.

TABLE

| Example | Grab Tensile (grams) | | % Elongation | | Energy (in lbs.) | | Trap Tear (Grams) | | Handel-O-Meter* (grams) | | Bulk (Inches) | Bulk Improvement (inches) |
|---|---|---|---|---|---|---|---|---|---|---|---|---|
| | MD | CD | MD | CD | MD | CD | MD | CD | MD | CD | | |
| 1 | 4855 | 4220 | 14.5 | 29.7 | 3.62 | 5.38 | 554 | 472 | 226.2 | 151.2 | .051 | |
| | | | | | | | | | | | | 0.007 |

TABLE-continued

| Example | Grab Tensile (grams) MD | CD | % Elongation MD | CD | Energy (in lbs.) MD | CD | Trap Tear (Grams) MD | CD | Handel-O-Meter* (grams) MD | CD | Bulk (Inches) | Bulk Improvement (inches) |
|---|---|---|---|---|---|---|---|---|---|---|---|---|
| 2 | 4538 | 4399 | 18.4 | 30.7 | 3.42 | 5.32 | 540 | 470 | 212.5 | 169.9 | .058 | |
| 3 | 5745 | 5449 | 19.9 | 36.9 | 4.98 | 7.64 | 1055 | 1045 | 236.2 | 115.1 | .044 | 0.005 |
| 4 | 5733 | 5901 | 30.1 | 43.0 | 7.45 | 10.56 | 1100 | 1135 | 190.0 | 108.2 | .049 | |
| 5 | 3310 | 3550 | 17.8 | 43.6 | 2.55 | 5.73 | 650 | 670 | 91.9 | 49.9 | .036 | 0.005 |
| 6 | 3337 | 2218 | 26.3 | 54.2 | 3.89 | 4.07 | 730 | 490 | 100.8 | 35.7 | .041 | |

*10 mm gap

While the examples have demonstrated the application of heat and pressure in patterned areas by means of bonding rolls, it will be apparent that other means may be used. For example, sonic bonding devices may be employed with a patterned anvil in the embodiment of FIG. 4.

Figure 2:
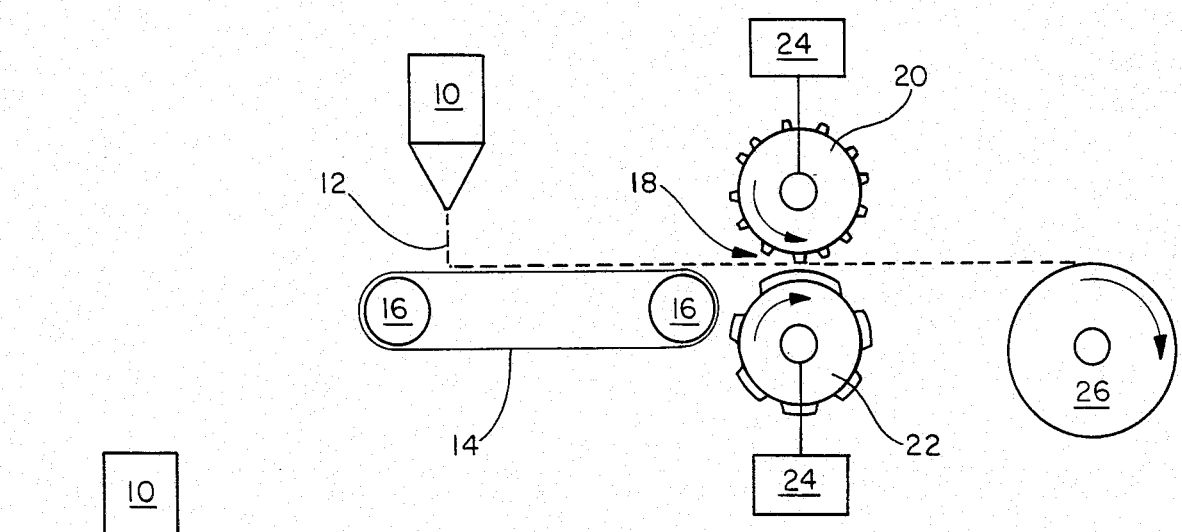
FIG. 2 is a schematic illustration of one arrangement for carrying out the process of the present invention with opposed line patterns.

Turning to FIG. 1, and as the foregoing examples demonstrate, the method of the present invention includes, generally, the steps of providing a web of thermoplastic intersecting fibers, with or without additional components, subjecting one surface of the web to a pattern of land area varying in shape, direction or size under heat and pressure conditions, subjecting the same or opposite surface to a pattern of land areas varying in shape, direction or size under heat and pressure conditions, and collecting the resulting bonded web. In most cases the patterns will be different but they may be the same if the orientation of the pattern is varied. One bonding arrangement is illustrated schematically in FIG. 2 where a single nip is employed. Extruder 10 produces filaments 12 which are collected on screen 14 rotating about rolls 16. The web is drawn through nip 18 formed by rolls 20 and 22 heated by means of heat source 24 and wound into roll 26.

Figure 3:
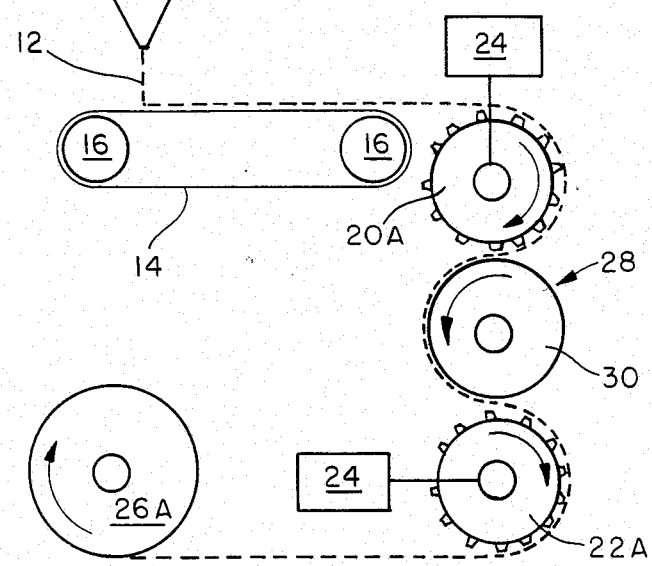
FIG. 3 illustrates an alternative arrangement with peg patterns.
Figure 4:
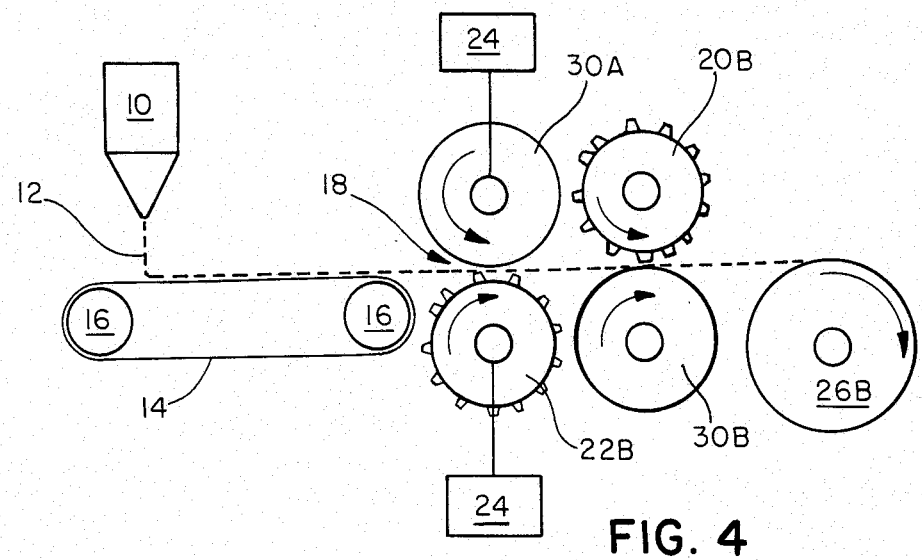
FIG. 4 illustrates a third such arrangement for use with peg patterns and/or sonic bonding means.

In FIG. 3 a double nip is employed in calender stack 28 comprising bonding rolls 20A and 22A and anvil roll 30. In this case pegs were employed as opposed to the line pattern. FIG. 4 illustrates a third bonding embodiment wherein two separate nips are employed by means of bonding rolls 20B and 22B and separate anvil rolls 30A and 30B. The arrangements of FIGS. 3 and 4 are useful for producing the combination of lower density patterns.

Figure 17:
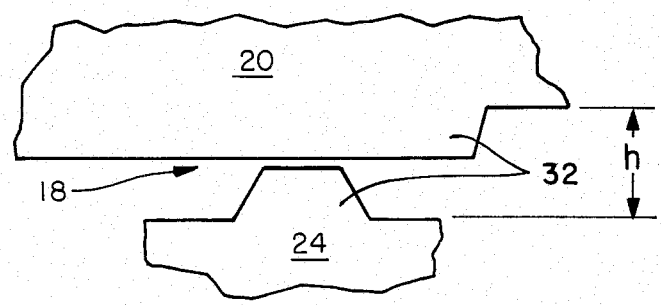
FIG. 17 is a greatly enlarged view of a bonding nip in illustrating a bonding step in accordance with the present invention.
Figure 11:
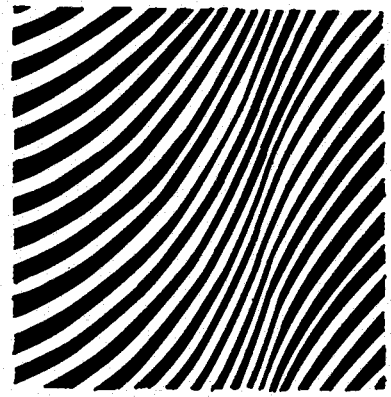
FIGS. 11 through 13 illustrate a third alternative bond arrangement using a line pattern.
Figure 12:
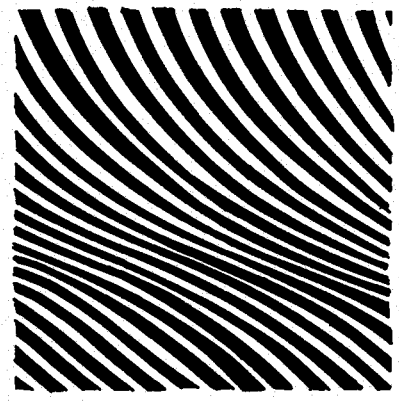
Figure 13:
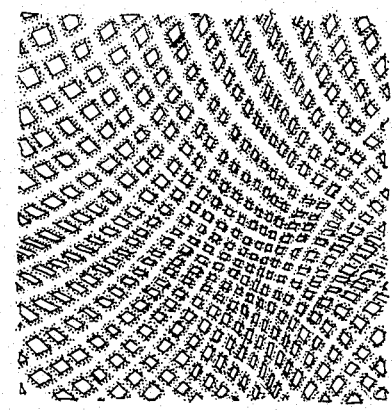
Figure 14:
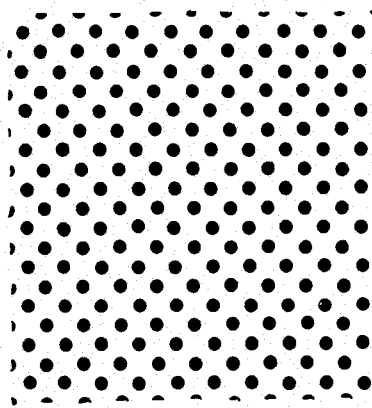
FIGS. 14 through 16 illustrate a fourth alternative bond arrangement using a peg pattern.
Figure 15:
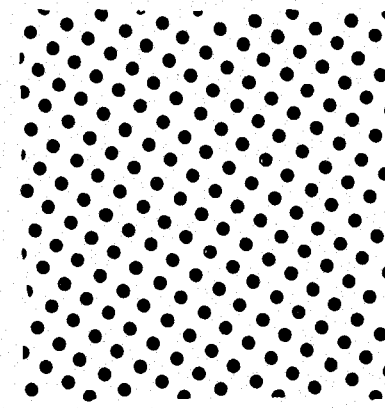
Figure 16:
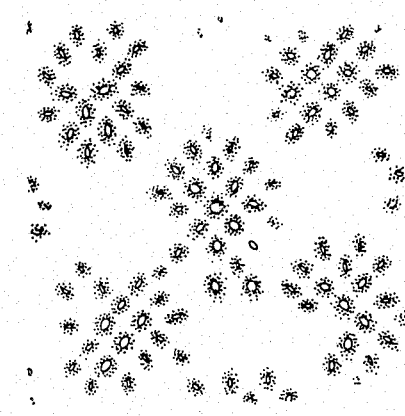

Turning to FIG. 17 wherein the fabric has been omitted for clarity, the bonding will be described in further detail. As shown, the nip 18 illustrated in FIG. 2 comprises opposing rolls having raised lines that intersect. The sloped sides 32 allow for increased wear and are essential for efficient engraving and yet permit the higher bond densities desired. As will be apparent, the angle of slope will determine the maximum pin depth available and the maximum number of pins that may occupy a given surface area. The smaller the angle from vertical, the greater may be both the depth and number of pins. The rolls may be constructed of materials commonly used for such purposes. Because both patterns are varying in shape, direction or size, the rolls may be rotated at the same speeds and yet obtain a desired high loft, varying pattern. FIGS. 5 through 7, 8 through 10, and 11 through 13, and 14 through 16 illustrate four preferred patterns and the resulting bonded web patterns.

As demonstrated, the invention provides a unique means for resolving problems inherent in prior attempts to attain high pin depth. By combining deeply engraved rolls as described, even greater total depth of bonding is attained while at a pin slope that permits engraving to be carried out in a conventional manner. These benefits are obtained without requiring registration of bonding rolls which is a particular feature and advantage of the present invention.

Materials resulting from the bonding process of the present invention have highly desirable textile-like web properties including appearance, strength, and feel. Yet they may be produced at high speeds consistent with nonwoven production. Uses of these materials include wipers, garments, and absorbent products, such as diapers and sanitary napkins for example.

Thus, it is apparent there has been provided, in accordance with the invention, a nonwoven thermally bonded material and means for making it that fully satisfy the objects, aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A high-loft nonwoven material having a basis weight in the range of from about 2 oz/yd to about 6 oz/yd comprising a web of thermoplastic filaments having an irregular and essentially nonrepeating pattern of bond areas of varying bond sizes and densities comprising a combination of bond patterns resulting in an average bond density of at least 40 bonds per square inch and an average total bond area percent coverage less than 40%.

2. The material of claim 1 wherein at least one of the combined patterns is a line pattern and the bonds are predominantly generally parallelogram shaped with a ratio of diagonals of less than 10 to 1.

3. The material of claim 1 wherein the thermoplastic filaments are meltblown microfibers selected from the group of polymers consisting of polyolefins, polyesters, polyamides, and copolymers and blends of these polymers.

4. The material of claim 3 wherein the filaments are meltblown polypropylene.

5. The material of claim 2 wherein the ratio of diagonals is less than 6 to 1 and the average bond density is at least about 90 bonds per square inch.

6. The material of claim 5 wherein the total percent bond area is less than 30%.

7. The material of claim 1 wherein up to about 75% by weight of additional material is incorporated into the web prior to bonding.

8. The material of claim 7 wherein the material incorporated is selected from the group consisting of cellulose fibers and staple fibers.

9. The material of claim 4 wherein said different bond patterns each comprise line patterns which cross at varying angles producing parallelogram-shaped bond areas, a majority of which have a diagonal ratio no greater than 10:1.

10. The material of claim 4 wherein said different bond patterns each comprise open patterns of different size or configuration.

11. A wiper comprising the material of claim 1.

12. The material of claim 1 in the form of a laminate of a plurality of layers, each comprising a web of thermoplastic filaments.

13. The method of producing a high-loft nonwoven material comprising the steps of,
 (a) forming a web comprising thermoplastic filaments, and
 (b) contacting said web under conditions of heat and pressure with two different bonding patterns producing an irregular and essentially nonrepeating pattern of bond areas of varying bond sizes and densities having an average density of at least 40 bonds per square inch and a total average percent bond area coverage of less than 40%.

14. The method of claim 13 wherein at least one of the combined patterns is a line pattern and the bonds are predominantly generally parallelogram shaped with a ratio of diagonals of less than 10 to 1.

15. The method of claim 13 wherein the thermoplastic filaments are meltblown microfibers selected from the group of polymers consisting of polyolefins, polyesters, polyamides, and copolymers and blends of these polymers.

16. The method of claim 13 wherein the filaments are meltblown polypropylene.

17. The method of claim 14 wherein the ratio of diagonals is less than 6 to 1 and the average bond density is at least about 90 bonds per square inch.

18. The method of claim 14 wherein the total percent bond area is less than 30%.

19. The method of claim 13 wherein up to about 75% by weight of additional material is incorporated into the web prior to bonding.

20. The method of claim 19 wherein the material incorporated is selected from the group consisting of cellulose fibers and staple fibers.

21. The method of claim 13 wherein the means for producing the bond patterns is a sonic bonder.

22. The method of claim 13 wherein the web comprises a laminate of a plurality of layers, each comprising a web of thermoplastic filaments.

23. The method of claim 13 wherein the web has a basis weight in the range of from about 2.0 oz/yd$^2$ to 6.0 oz/yd$^2$, and wherein the bonding patterns have combined engraving depths of at least about 0.025 inch.

* * * * *